United States Patent [19]

Arends

[11] 4,330,870
[45] May 18, 1982

[54] OPTICAL DATA LINK

[75] Inventor: Thomas C. Arends, San Antonio, Tex.

[73] Assignee: Datapoint Corporation, San Antonio, Tex.

[21] Appl. No.: 184,355

[22] Filed: Sep. 5, 1980

[51] Int. Cl.³ .............................................. H04B 9/00
[52] U.S. Cl. .................................. 455/617; 455/607; 455/618; 455/619
[58] Field of Search ............... 455/601, 606, 607, 608, 455/610, 612, 617, 618, 619; 358/227; 354/25; 350/46, 47

[56] References Cited

U.S. PATENT DOCUMENTS

| | | | |
|---|---|---|---|
| 3,555,181 | 2/1971 | Thommen et al. | 358/174 |
| 3,705,986 | 12/1972 | Sanders et al. | 250/199 |
| 3,767,853 | 10/1973 | Bendell et al. | 358/174 |
| 4,010,480 | 3/1977 | Sato | 354/43 |
| 4,037,254 | 7/1977 | Monahan | 358/228 |
| 4,050,085 | 9/1977 | Prince et al. | 358/219 |
| 4,060,756 | 11/1977 | Watanabe et al. | 318/668 |
| 4,070,572 | 1/1978 | Summerhayes | 455/612 |
| 4,075,641 | 2/1978 | Uno et al. | 354/43 |
| 4,080,627 | 3/1978 | Wheeler | 358/162 |
| 4,142,785 | 3/1979 | Saito | 352/141 |
| 4,234,971 | 11/1980 | Lutes, Jr. | 455/617 |
| 4,262,366 | 4/1981 | Gumurian | 455/619 |

FOREIGN PATENT DOCUMENTS

2529479  1/1977 Fed. Rep. of Germany ...... 455/619

*Primary Examiner*—Joseph A. Orsino, Jr.
*Attorney, Agent, or Firm*—McCamish, Ingram, Martin & Brown, Inc.

[57] ABSTRACT

The disclosed optical data link provides full-duplex, high-data rate optical communications between geographically separate data processing facilities by means of identical optical transceivers. Transmitter optics include an LED and a collimating Fresnel lens for providing a collimated, modulated light beam. Receiver optics include a focusing Fresnel lens and a photoreceptor for converting the impinging modulated light beam into corresponding electrical signals, which are amplified by a gain-controlled amplifier. The LED is selectively translatable along its optical axis to provide focal length correction for temperature-induced focal length distortion, while the photoreceptor is selectively translatable along its optical axis to provide, in addition to focal length correction, a preselected amount of optical energy attenuation. To control the output signal level from the gain-controlled amplifier, a microprocessor in the gain control loop is responsive to a signal level code to selectively enable successive levels of electronic attenuation in the gain-controlled amplifier, and, if the dynamic range of electronic attenuation is exhausted without achieving an optimum output signal level, to selectively adjust the level of optical attenuation by incrementally translating the photoreceptor. To control transmitted signal power, the microprocessor is responsive to a temperature indication code to translate the light emitting diode to the actual focal length of the associated Fresnel lens, thereby correcting temperature-induced focal length distortion and optimizing transmitted signal power.

6 Claims, 3 Drawing Figures

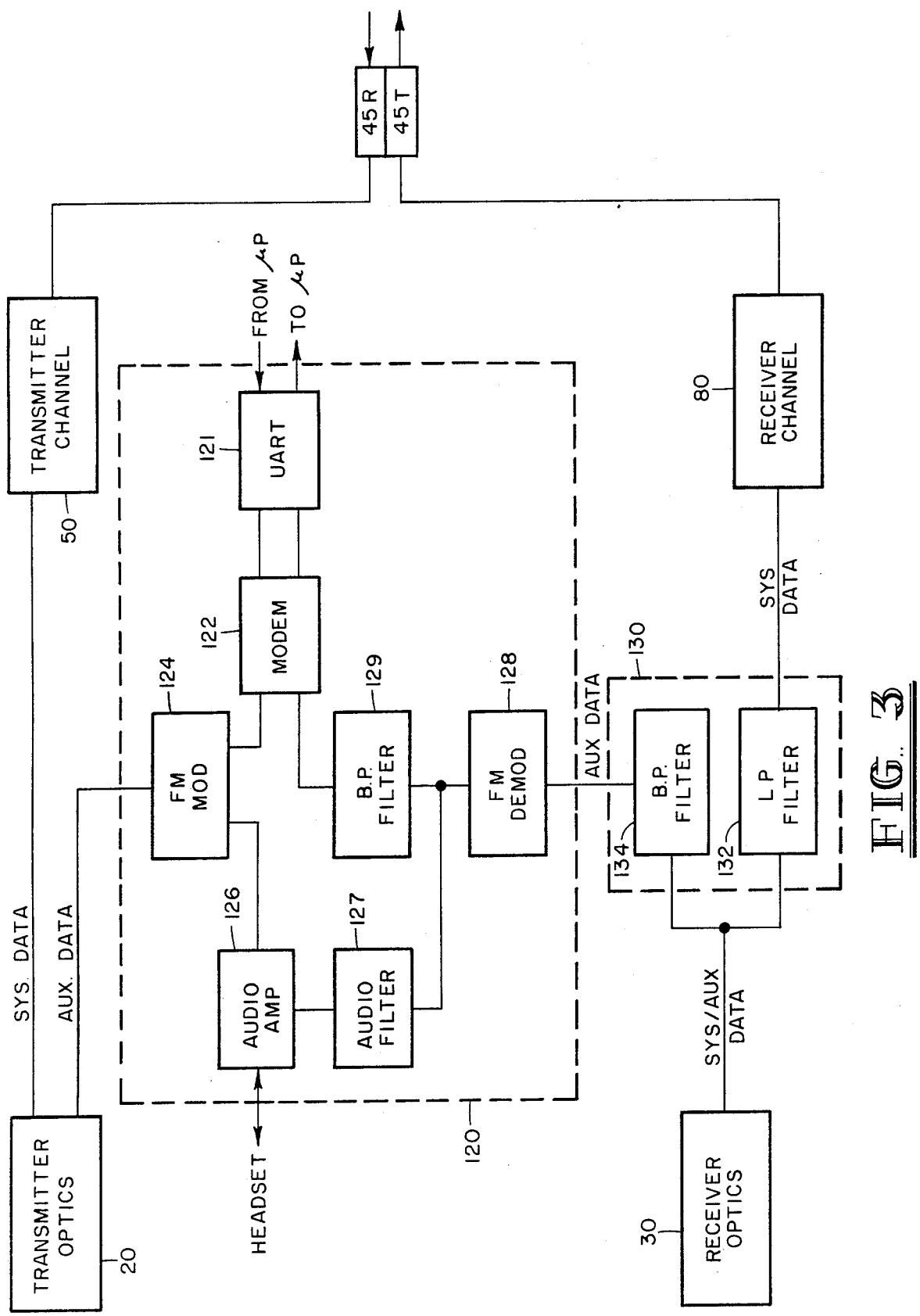

OPTICAL DATA LINK

BACKGROUND OF THE INVENTION

The present invention relates to an optical data link for providing high-speed data communication between electronic data processing equipment at geographically separate locations to permit the full system integration of the electronic data processing equipment.

The trend in configuring electronic data processing (EDP) systems is toward dispersing the access to EDP equipment. For dispersed EDP equipment located in the same building, interconnecting the various physically separate units can usually be accomplished by cabling. However, as system architectures expand to incorporate EDP equipment dispersed in separate buildings, transmitting data becomes more complex. The installation of dedicated inter-building cabling, even where technically feasible, may be economically or physically impractical. Inter-building data communication via telephone transmission facilities is costly and can reduce system flexibility and integration because of the inherent limitations on teleprocessing data transfer rates.

One solution to the problem of inter-building, high-data rate data communication is to use a communication link to transmit data over a modulated light beam. Optical communication systems have been used for many years—an example of an early optical data system is shown in U.S. Pat. No. 3,705,986 to Sanders. The trend toward dispersed data processing has given new impetus to the development of such systems for high-speed digital data communication.

While optical data links have been devised using coherent laser light, the use of non-coherent light is advantageous in terms of cost and avoiding governmental regulatory restrictions. However, the use of non-coherent light imposes severe gain control and attendant signal reproduction requirements, particularly at current multiple megabit data transfer rates. To illustrate, for a range of one to two miles, an optical data link must provide signal amplification for a data signal whose amplitude may vary over a range of one to one million while the signal-to-noise ratio of the received modulated optical signal is typically in a range from 1/1,000 to 1/10,000. Signal processing is particularly complicated during daylight hours by the presence of background noise having a DC component due to sun light and AC components due primarily to atmospheric scintillation.

An optical data link can use two different attenuation techniques to provide gain control. First, electronic attenuation control can be provided in the gain stage(s) of the receiver channel electronics to regulate the amount of signal amplification. Second, the amount of optical energy impinging upon a photoreceptor at the receive-end of the link can be regulated by mechanical means (such as by closing an iris), thereby regulating the amount of optical energy available to be converted to the electrical signals supplied to the gain stage(s). While electronic attenuation is preferred, dynamic range requirements preclude the sole reliance on electronic attenuation for providing gain control. Therefore, electronic attenuation must be supplemented by some means of regulating the amount of optical energy coupled to the receive-end photoreceptor. However, the amount of such optical attenuation is preferably minimized because optical attenuation reduces modulated signal level by a linear function while superimposed noise is reduced only by a square root function; so that the signal-to-noise ratio is adversely affected.

Optical energy attenuation unrelated to gain control can affect gain control and signal reproduction where an optical data link transceiver with plastic optical elements is subject to ambient temperature variations. Current optical data links typically use plastic Fresnel lenses both at the transmit-end for collimating the modulated light output from a radiant source and at the receive-end for focusing incident optical energy onto a photoreceptor; plastic Frensnel lenses are used because they are obtainable in large diameters at a fraction of the cost of a glass lens. However, when plastic lenses are used in an environment subject to significant temperature variation they are susceptible to temperature distortion that can significantly alter the lens focal length. For example, typical ambient temperature variations can alter the focal length for a 10-inch diameter plastic Fresnel lens by as much as $\frac{1}{2}$ inch.

Such temperature-induced focal length distortion affects both optical transmission and reception. At the transmit-end, a temperature-induced translation of the lens focal point reduces the amount of optical energy from the radiant source (located at the nominal lens focal point) that is collimated for transmission over the optical data link. At the receive-end, focal point translation attenuates the optical energy coupled to a photoreceptor (located at the nominal lens focal point). Since system flexibility requires that the optical data link design accommodate those applications where exterior (balcony or rooftop) transceiver mounting is required, some means of correcting temperature-induced focal length distortion would be advantageous.

OBJECTS OF THE INVENTION

The limitations of current optical communication systems are overcome by the present invention which has a general object to provide an optical data link for full-duplex, high-data rate optical communication between geographically separate data processing facilities. Specific objects of the present invention include providing such an optical data link that incorporates:

1. A signal level control system that insures both optimum transmitted signal power at the transmit-end and optimum received signal level at the receive-end.

2. A focal length correction network for correcting temperature-induced distortion in the focal lengths of the collimating lens at the transmit-end and the focusing lens at the receive-end.

3. A gain-control system that uses both optical attenuation and electronic attenuation to provide an optimum output signal level, and exhibits programmed hysteresis such that the dynamic range of electronic attenuation is exhausted before optical attenuation is engaged.

4. A self-clocking encoding technique to format data for transmission such that the system clock used to synchronize data transmission can be recovered at the receive-end, thereby synchronizing data reception with data transmission.

5. A clock-loss detection network that detects a failure to recover the system clock due to a deterioration in the signal-to-noise ratio, and provides a clock-loss indication that can be used to shut-down the optical data link to prevent the transmission of error-prone data.

6. An auxiliary channel for transmitting intra-link information (voice/facsimile/data) over the optical data link, with the auxiliary information being multiplexed with the transmitted data and separated at the receive-end for recovery.

7. A sun-blind prevention network to prevent sunlight from impinging directly upon either the LED or the photoreceptor.

SUMMARY OF THE INVENTION

Briefly, to accomplish these and other objects that will be apparent to those of ordinary skill in the art, the optical data link of the present invention comprises an optical transmitter network and an optical receiver network positioned in spaced facing relation to establish parallel optical communications paths. The optical transmitter network includes a radiant energy source for converting electrical data signals into modulated radiant energy, and a lens or other optical element for collimating the modulated radiant energy. The optical receiver network includes a lens or other optical element for focusing impinging modulated radiant energy, a photoreceptor to convert the radiant energy into corresponding electrical signals, and a gain-controlled amplifier network for amplifying these electrical signals. Signal level control, to achieve both optimum transmitted signal power at the transmit-end and optimum output signal level at the receive-end, is provided by: (a) a focal length correction system responsive to a temperature indication to correct temperature-induced focal length distortions in both the collimating and focusing optical elements, and (b) a gain-control system responsive to the output signal level from the amplifier network to selectively attenuate such output signal within a predetermined dynamic range of attenuation so as to provide an optimum output signal level, and, if the dynamic range for electronic attenuation is exhausted without achieving the optimum output signal level, to selectively attenuate the modulated radiant energy incident on the photoreceptor.

For a preferred optical data link, the photoreceptor and the radiant energy source (an LED) are translatable along respective optical axes for focal length correction and, in the case of the photoreceptor, for optical attenuation. A microprocessor in the gain-control loop is responsive to the output signal level from the gain-controlled amplifier to incrementally adjust the level of electronic attenuation within a predetermined dynamic range to provide optimum output signal level. If the dynamic range for electronic attenuation is exhausted, the microprocessor generates a translation signal to incrementally translate the photoreceptor so as to adjust the level of optical attenuation. In this manner, the microprocessor controlled gain control loop incorporates gain-control hysteresis to inhibit any adjustment in optical attenuation until the dynamic range for electronic attenuation is exhausted. The microprocessor is also responsive to a temperature code respresentative of ambient temperature to control the translation of the LED to the actual focal point of the collimating lens, thereby counteracting temperature-induced focal length distortions and insuring optimum transmitted signal power.

To synchronize data transmission and reception, the transmitted data is formatted according to a self-clocking code so that the receive-end electronics can recover the system clock used to encode the data and accurately decode and recover the transmitted information. A clock-loss detection network provides a clock-loss indication to the microprocessor if the system clock cannot be accurately recovered. In response, the microprocessor can shut-down the optical data link to prevent the transmission of error-prone data.

To prevent the distruction of either the photoreceptor or the photodiode due to the direct impingment of sunlight, the microprocessor is responsive to a signal indicative of such a sun-blind condition to close shutters optically in front of the photoreceptor and the LED.

BRIEF DESCRIPTION OF THE DRAWINGS

The novel features believed to be characteristic of the present invention are set forth in particularity in the appended claims. However, a more complete appreciation of the present invention, both as to organization and mode of operation, and the attendent advantages will result as the same becomes better understood by reference to the following detailed description of the preferred embodiment when considered in conjunction with the accompanying drawings, in which:

FIG. 3 is a functional blocked diagram of the optical transceiver showing the auxiliary channel in greater detail.

DESCRIPTION OF THE PREFERRED EMBODIMENT

The present invention is described in relation to a preferred optical data link for providing full-duplex, optical communication between geographically separated data utilization devices of, for example, an electronic data processing system or a digital telephone system. The optical data link provides a pipeline communication facility for high-data rate communication between geographically separate locations, with the particular system architectures for data generation and utilization at these locations being irrelevant to the operation of the link.

For the purpose of this detailed description, the data stream input to the optical data link comprises asynchronously clocked message packets separated by arbitrarily long idle-time periods. While such a data format is not necessary to the practice of the present invention, it is commonly used in current dispersed data processing systems. Also, the data stream voltage levels required by the utilization devices are assumed to be different than the voltage levels (such as TTL) required by the optical data link electronics, although this assumption is not necessary to the practice of the present invention.

The optical data link uses a pair of identical optical transceivers each including an optical transmitter unit and an optical receiver unit positioned in side-by-side relation, both having suitable optics directed in parallel paths. The pair of optical transceivers is positioned in aligned, facing relationship to provide full duplex (or one-way) data communications between their respective locations. Since the pair of optical transceivers are identical, only one is described in detail.

TRANSCEIVER-GENERAL

Figure 1:
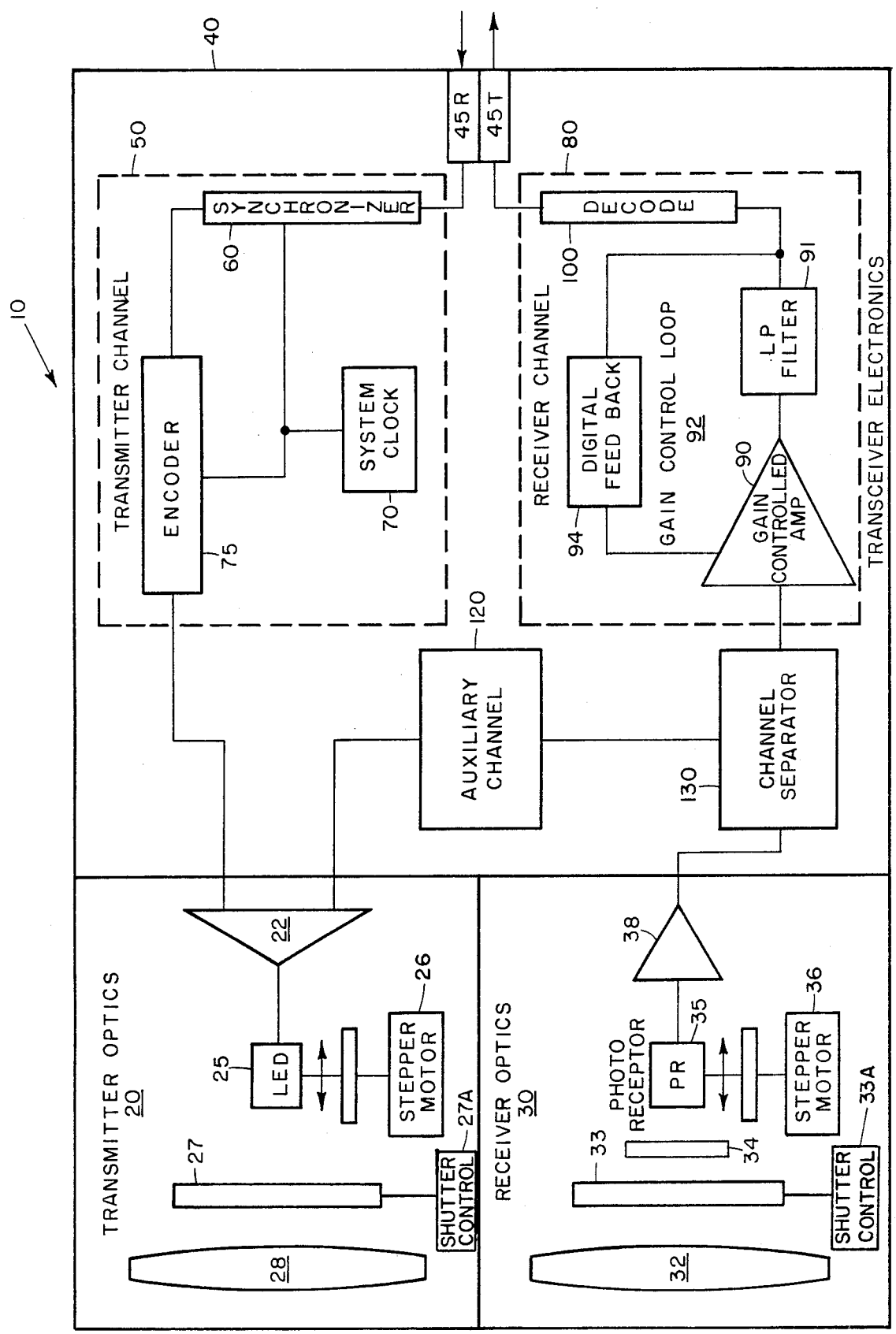
FIG. 1 is a functional block diagram of an optical transceiver according to the present invention showing transmitter optics, receiver optics, and transceiver electronics which include a transmitter channel, a receiver channel and an auxiliary channel.

Referring to FIG. 1, an optical transceiver 10 includes transmitter optics 20, receiver optics 30 and transceiver electronics 40. Transmitter optics 20 and receiver optics 30 are positioned side-by-side with aligned optical axes to establish parallel optical communications channels. Transceiver electronics 40 includes an interface line receiver/transmitter 45R/45T, a transmitter channel 50, a receiver channel 80 and an auxiliary channel 120.

Interface line receiver transmitter 45R/45T functions as the interface between optical transceiver 10 and the associated utilization devices (not show), providing voltage level conversion between the data stream voltage levels required by the utilization devices and the voltage levels used in transceiver electronics 40. Voltage level conversion may be accomplished in a conventional manner, such as by using a matched filter and a threshold detector.

A data stream presented to interface line receiver 45R is communicated over the optical data link as follows. After voltage level conversion, the asynchronous data stream is applied to transmitter channel 50 which includes a synchronizer network 60 that synchronizes the data stream with a system clock 70. The data stream is then encoded according to a self-clocking format by an encoder network 75; the self-clocking format enables the system clock to be recovered in the receiver channel of the receive-end optical transceiver, thereby insuring that the transmitted data signal can be accurately decoded and recovered. The encoded data signal is applied to transmitter optics 20 which generates an amplitude modulated beam of collimated light that propagates to the receiver optics of the facing optical transceiver.

At the receive-end of the optical data link, receiver optics 30 converts impinging optical energy (consisting of a portion of the transmitted modulated light beam together with superimposed noise) into an electrical data signal that is coupled to receiver channel 80. In the receiver channel, the data signal is amplified by a gain-controlled amplifier 90, with noise superimposed on the data signal being filtered out by a low pass filter 91. The amplified data signal is applied to a decode network 100 which recovers the system clock and decodes the data signal to recover the transmitted information. The recovered data stream is coupled to interface line transmitter 45T for voltage level conversion and transmission to the receive-end utilization devices.

The preferred embodiment optimizes both transmitted signal power and output signal gain using: (a) electronic attenuation, (b) optical energy attenuation where electronic attenuation is inadequate, and (c) focal-length correction for temperature-induced lens distortion at both the transmit and receive ends. Electronic and optical attenuation are used to provide signal level gain control at the receive-end of the optical data link; the primary function of focal-length correction is to provide optimum output signal power at the transmit-end because the effects of receive-end focal length distortion are primarily counteracted by the electronic/optical attenuation function.

Electronic attenuation is provided by a digital electronic attenuator network in gain-controlled amplifier 90 responsive to an electronic attenuation signal. Optical attenuation and focal-length correction are provided by translating the light emitting diode in transmitter optics 20 and a photoreceptor in receiver optics 30 along their optical axes in response to translation signals—focal-length correction at the transmit end is accomplished by translating light emitting diode to the new focal point, while optical (gain control) attenuation at the receive-end is accomplished by appropriately translating the photoreceptor toward or away from the actual focal point.

To achieve optimum signal power output at the transmit end and optimum signal gain at the receive-end, receiver channel 80 establishes an optimum combination of electronic and optical attenuation, and provides focal-length correction, by means of a gain control loop 92. Gain control loop 92 includes gain-controlled amplifier 90 and a microprocessor-controlled digital feedback network 94. The digital feedback network is responsive both to the signal level output from amplifier 90 and to a digital representation of the ambient temperature to provide the necessary electronic attenuation and translation signals to achieve optimum signal power output and an optimum level of electronic and optical attenuation.

TRANSCEIVER OPTICS

As diagrammed in FIG. 1, transmitter optics 20 includes a driver amplifier 22 coupled to receive the encoded, amplitude modulated data signal from encoder network 75 and a frequency modulated auxiliary data signal from auxiliary channel 120. Driver amplifier multiplexes the two data signals and AM/FM modulates the optical energy output from a light emitting diode (LED) 25. The modulated optical output from LED 25 passes through a shutter 27 and is collimated by suitable optics, such as a plastic Fresnel lens 28.

The receiver optics 30 includes suitable optics, such as a plastic Fresnel lens 32, for focusing the impinging portion of the modulated light beam transmitted by the facing optical transceiver (along with superimposed noise). The incident optical energy is focused through a shutter 33 to impinge upon a photoreceptor 35 which converts the optical energy into electrical signals. Narrow band optical filter 34 is tuned to the LED emission wavelength so that it suppresses extraneous background wavelengths while passing optical energy at the LED emission wavelength.

LED 25 is incrementally translatable along the optical axis of transmitter optics 20 by stepper motor 26 while photoreceptor 35 is incrementally translatable along the optical axis of receiver optics 30 by a stepper motor 36. As previously discussed, LED/photoreceptor translation is used: (1) to correct for temperature-induced distortions in the focal length of lenses 28 and 32, and (2) in the case of the photoreceptor, to provide a selected amount of optical energy attenuation. The stepper motors 26 and 36 are responsive to respective translation signals generated by the microprocessor in the digital feedback network to incrementally translate LED 25 and/or photoreceptor 35 to respective selected positions relative to a nominal lens focal point.

The electrical signal output from photoreceptor 35 is applied to a preamplifier 38. Preamplifier 38 provides initial gain and, in addition, generates a signal corresponding to the DC level of the photoreceptor output, i.e., corresponding to the superimposed background (sunlight) noise in the optical energy incident on photoreceptor 35. This DC level signal is coupled to the microprocessor within digital feedback network 94 which generates shutter control signals for actuating shutters 27 and 33. Shutters 27 and 33 are closed whenever the magnitude of the optical energy impinging upon photoreceptor 35, as represented by the DC level signal, indicates a sun-blind condition, i.e., when the sun is sufficiently aligned with the optical axes of transceiver 10 that sunlight impinges directly upon photoreceptor 35 and LED 25, a condition which could destroy the photoreceptor and/or the LED.

While the preferred technique for providing optical attenuation and focal length correction is to make both the LED and the photoreceptor translatable along respective optical axes, other techniques can be used. For example, optical attenuation can be provided by an optical iris or optical attenuator (such as an array of neutral density filters) responsive to signals corresponding to the translation signals supplied to stepper motor 36. Focal length correction can be provided by a lens translation arrangement, such as using plastic rods coupled to the periphery lens that expand/contract in length by an amount corresponding to the temperature-induced translation of the lens focal point, or by an optical arrangement, such as using a temperature-stable glass lens intermediate the plastic lens and its focal point to reduce the effects of temperature variation on the composite focal length. The preferred LED/photoreceptor translation technique was chosen for a preferred embodiment because: (a) it combines optical and focal length correction into one mechanically implemented system, and (b) it permits the mechanical implementation of both optical attenuation and focal length correction to be digitally actuated under central microprocessor control.

A preferred LED is a light emitting diode that emits radiation in the infrared range, while a preferred photoreceptor is a silicon diode sensitive to the infrared energy emitted by the LED. Plastic Fresnel lenses are preferred for the lenses 28 and 32 because they are relatively low in cost even at fairly large diameters of 7 to 10 inches. Such lenses provide light gathering and focusing capabilities comparable to glass lenses at a fraction of the cost.

TRANSCEIVER ELECTRONICS

The transmitter channel 50 and the receiver channel 80 of transceiver electronics 40 will now be described with reference to the functional diagram in FIG. 2.

As previously indicated, the asynchronously clocked message packets of a data stream are coupled via interface line receiver 45R to synchronizer network 60. Synchronizer network 60 includes a First-In-First-Out (FIFO) memory 61, which is coupled to receive these message packets, and a FIFO control network 61A which clocks data into and out of the FIFO memory. The FIFO memory 61 temporarily stores a portion of each message packet so that the individual data bits of the packet can be clocked out of the FIFO memory by FIFO control network 61A in synchronism with system clock 70. FIFO memory 61 is sufficiently large that, if the data stream clock rate exceeds the clock rate established by system clock 70 by a worst-case amount, the FIFO memory will not overflow; FIFO control network 61A inhibits the clocking out of data from the FIFO memory until it is sufficiently full that, if the data stream clock rate is less than the system clock rate by a worst-case amount, the FIFO memory will not empty prior to the end of a data message packet. Typically, the size of FIFO memory 61 need not exceed 10 bits.

System clock 70, for example a quartz crystal oscillator, synchronizes the transmission of data over the optical data link to a predetermined data rate. While the system clock only directly synchronizes data transmission, the use of a self-clocking code to format the transmitted data enables the receiver channel 80 of the receive-end transceiver to recover the system clock and accurately decode the transmitted data.

Figure 2:
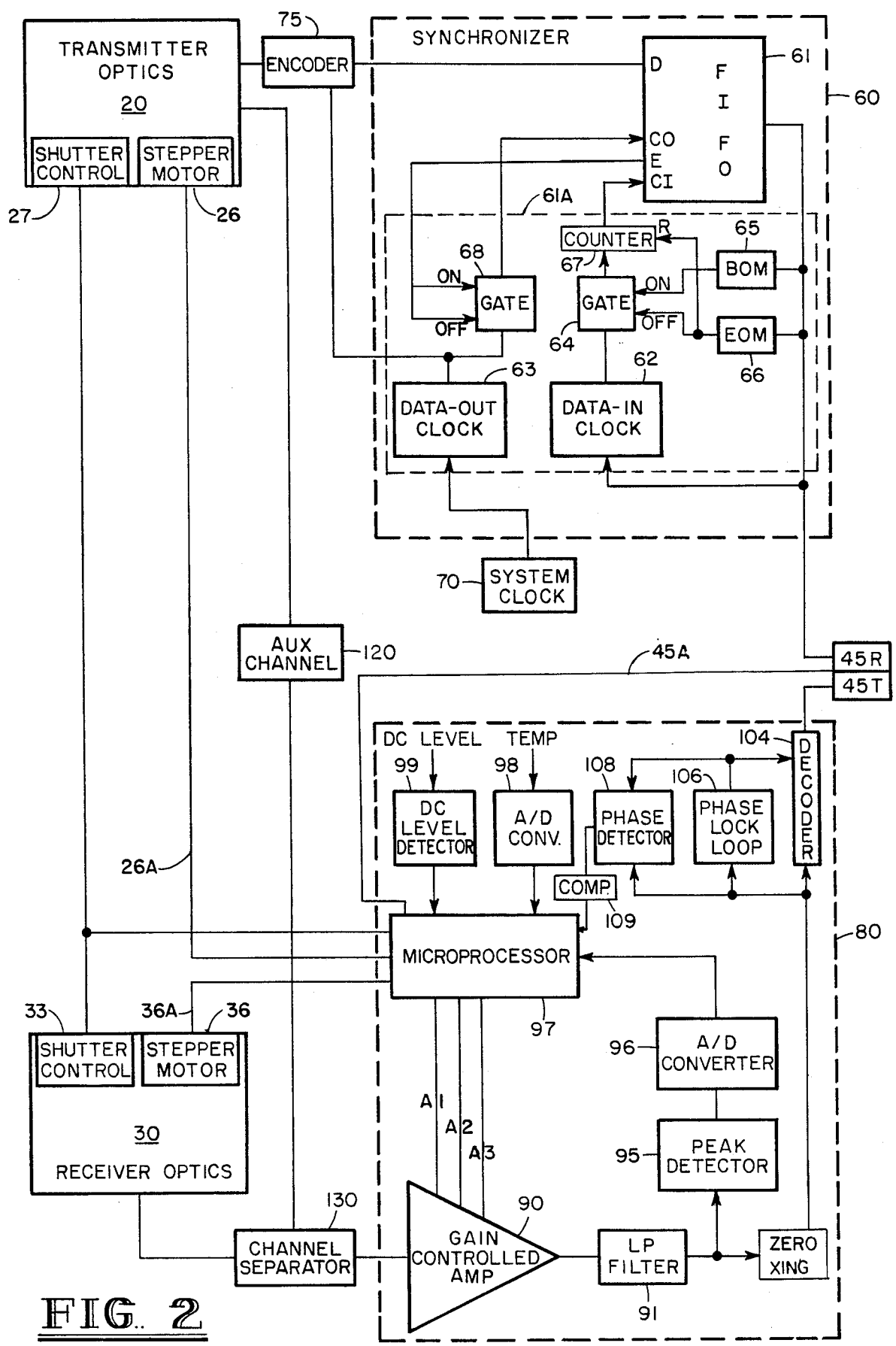
FIG. 2 is a functional block diagram of the optical transceiver showing the optical transceiver electronics in greater detail.

FIFO control 61A can be designed according to conventional clocking techniques; the technique illustrated in FIG. 2 is illustrative. (The following discussion assumes that FIFO memory 61 is initially empty, i.e., the data bits of the last-received message packet have been previously clocked out of the FIFO memory.) A data-in clock 62 provides clock pulses through a gate 64 and a counter 67 to the clock-in input CI of FIFO memory 61. Gate 64 is controlled by a beginning-of-message detector 65 and an end-of-message detector 66. The beginning-of-message detector 65 is responsive to the beginning of a message packet to open gate 64, enabling data-in clock 62 to clock the data bits of an input message packet into FIFO memory 61. Data-in clock 62 is a free-running clock having a clock rate corresponding to the frequency of the incoming data; the data-in clock is instantaneously phased to the leading-edge of the first data bit for each input message packet, enabling it to synchronously clock-in the data bits of each asynchronously clocked message packet.

System clock 70 provides synchronizing clock pulses to a data-out clock 63 which establishes a system clock rate. Clock pulses from data-out clock 63 are coupled through a gate 68 to the clock-out input CO of FIFO memory 61. Gate 68 is controlled by counter 67 and FIFO memory 61. Counter 67 counts the clock-in pulses applied to the clock-in input CI to FIFO memory 61 and provides an enabling pulse after a predetermined number of clock-in pulses (i.e., after a predetermined number of data bits have been clocked into the FIFO memory). The enabling pulse output from counter 67 is applied to gate 68 which opens to enable synchronizing clock pulses to be applied to the clock-out input CO, synchronously clocking data out of FIFO memory 61 at the clock rate established by system clock 70.

At the end of a message packet, the end-of-message detector 66 generates a disenabling pulse to close gate 64 so that data-in clock pulses are no longer applied to the clock-in input of FIFO memory 61. The data-out clock continues to synchronously clock the stored data bits of the message packet out of FIFO memory 61; when all of the data bits have been clocked out of the FIFO memory, an empty indication appears at its empty output E and is applied to gate 68. Gate 68 then closes to prevent data-out clock pulses from being applied to the clock-out input. The disenabling pulse output from end-of-message detector 66 is also applied to the reset input to counter 67, resetting it in preparation for the next message packet. The above-described clock-in/clock-out cycle is repeated for each message packet appearing at the interface line receiver 45R.

The design of beginning-of-message detector 65 and end-of-message detector 66 must be tailored to the format of the particular data signal scheme. Typically, they will include address recognition circuitry for recognizing the beginning-of-message and end-of-message address codes transmitted as part of each message packet.

The above-described synchronizer network is required only in the case of asynchronously clocked message packets; it can be eliminated when the optical transceiver is transmitting synchronous data, such as is the case for certain telephone applications. For such synchronous data applications, the input data stream can be applied directly to encoder 75.

The data clocked out of FIFO memory 61 are applied to encoder network 75, which is clocked by the system clock 70. The encoder network 75 encodes the input data bits according to a self-clocking encoding format which enables the system clock to be recovered in the receiver channel 80 at the receive-end of the optical data link.

Any self-clocking encoding format can be used in the practice of the present invention. Illustratively, the well-known modified frequency modulation format (also known as delay modulation and Miller code) can be used. Formatting the data according to modified frequency modulation (MFM) has a number of advantages in addition to clock recovery. The spectrum of MFM data has very little DC value so that the circuitry of the receiver channel 80 can be AC coupled. Also, the fact that the spectrum of the modulated optical beam has very little DC component aids in separating the data signal from superimposed noise.

As discussed previously with reference to FIG. 1, the encoded (MFM) data signal is applied to transmitter optics 20 where driver amplifier 22 correspondingly amplitude modulates the optical energy output of LED 25. A high-frequency frequency modulated auxiliary data signal from auxiliary channel 120 is also applied to the LED driver amplifier and multiplexed with the AM data signal so that the optical energy output from the LED comprises a high frequency FM signal superimposed on the AM data signal. The AM/FM modulated light beam is transmitted over the optical data link to the receive-end optical transceiver where the impinging optical energy is converted into electrical signals by photoreceptor 35, with preamplification being provided by preamplifier 38. The preamplified AM/FM data signal is applied to a channel separator 130 which extracts the high-frequency FM auxiliary data signal and couples the AM data signal to receiver channel 80 for amplification and decoding.

After channel separation, the AM data signal is applied to gain-controlled amplifier 90 which includes a digital electronic attenuator network. For the preferred embodiment, the digital electronic attenuator network comprises three separate electronic attenuators, a divide-by-two attenuator, a divide-by-four attenuator and a divide-by-sixteen attenuator. In response to a three-bit electronic attenuation signal applied to inputs A1, A2 and A3 of gain-controlled amplifier 90, one or more of these electronic attenuators is enabled to provide a selected amount of attenuation. Gain-controlled amplifier 90 and low pass filter 91 together with a peak detector 95, an A/D (analog to digital) converter 96 and microprocessor 97 (which comprise the digital feedback network 94 in FIG. 2) from gain control loop 92. Peak detector 95 and A/D converter 96 form a signal level detector that provides a digital representation of the output signal level from gain-controlled amplifier 90. Peak detector 95 provides an analog representation of the magnitude of the amplified data signal from gain-controlled amplifier 90 which A/D converter 96 then converts into a digital code representative of output signal level; this digitized signal level code is applied to microprocessor 97. The microprocessor 97 is responsive to the signal level code to provide the translation and electronic attenuation signals that control, respectively, optical and electronic signal attenuation. Microprocessor 97 includes three electronic attenuation outputs, corresponding to the three-bit electronic attenuation signal, coupled to, respectively, the A1, A2 and A3 inputs of gain-controlled amplifier 90, and a translation signal output coupled via line 36A to the stepper motor 36 that controls photoreceptor translation.

The electronic attenuation signal is generated as follows. The signal level code is compared in microprocessor 97 with a reference code representative of a predetermined optimum output signal level. This comparison function detects any discrepancy between the actual and optimum output signal level; in response to a discrepancy microprocessor 97 generates an appropriate three-bit electronic attenuation signal to incrementally increase or decrease (by one level of attenuation) the attenuation provided by the electronic attenuators in gain-controlled amplifier 90.

For example, assume that the divide-by-two and the divide-by-four electronic attenuators are enabled, providing a total attenuation factor of 8. If a comparison of the signal level code with the reference code indicates that increased attenuation is necessary, then microprocessor 97 will provide the appropriate electronic attenuation signal to enable the next higher level of electronic attenuation by disenabling the divide-by-two and the divide-by-four attenuators and enabeling the divide-by-sixteen attenuator. On the other hand, if the comparison function indicates that a decreased amount of attenuation is necessary, then microprocessor 97 will generate the appropriate electronic attenuation signal to incrementally reduce the level of electronic attenuation by disenabling the divide-by-two attenuator. At each successive level of electronic attenuation, the output signal level from gain-controlled amplifier 90 is again detected, converted into a representative signal level code and compared with the reference code by microprocessor 97.

If, after a series of incremental changes, the dynamic range for electronic attenuation is exhausted, i.e., the maximum or minimum level of electronic attenuation is enabled, and the signal level comparison function continues to indicate that, respectively, more or less signal attenuation is required, than the level of optical energy attenuation is appropriately adjusted. Specifically, microprocessor 97 generates an appropriate translation signal that is coupled via line 36A to the stepper motor 36 which, as discussed previously with reference to FIG. 1, controls the incremental translation of photoreceptor 35. To incrementally increase optical attenuation, thereby decreasing signal level output from amplifier 90, microprocessor 97 generates a translation signal to cause stepper motor 36 to translate the photoreceptor away from the actual lens focal point by a predetermined, discrete amount. Conversely, to incrementally decrease optical attenuation, thereby increasing the signal level output from amplifier 92, microprocessor 97 causes the photoreceptor 35 to incrementally translate toward the actual focal point. (As discussed below, the actual lens focal point is determined by microprocessor 97 in response to a temperature indication code.)

For a preferred embodiment, the magnitude of an incremental change in optical attenuation is chosen to be sufficiently large that overcompensation results, i.e., the output signal level from gain-controlled amplifier 90 is overcorrected. For example, in the case of maximum electronic attenuation and an incremental increase in the level of optical attenuation the resulting output signal level will be excessively decreased and fall below optimum. In the manner described above, microprocessor 97 will then respond by incrementally reducing the level of electronic attenuation until the comparison function indicates optimum output signal level. Conversely, in the case of minimum electronic attenuation and an incremental decrease in the level of optical attenuation the resulting output signal level will exceed optimum and microprocessor 97 will respond by incrementally increasing the level of electronic attenuation.

By first exhausting the dynamic range for electronic attenuation before introducing any change in the level of optical attenuation, programmed hysteresis is incorporated into the gain control system of the present invention. For situations where an increasing level of attenuation is required, this gain control hysteresis technique is consistent with preventing gain-control-related degradation of the signal-to-noise ratio. That is, the hysteresis embodied in the gain control system inhibits an increase in the level of optical attenuation, which tends to degrade the signal-to-noise ratio, until the maximum available electronic attenuation is enabled. However, in instances where a reduction in signal attenuation is required, signal-to-noise ratio considerations alone dictate that optical attenuation be decreased before electronic attenuation to improve the signal-to-noise ratio.

The preferred embodiment retains gain control hysteresis in the case of decreasing attenuation for the purpose of reducing the duty cycle of the mechanically implemented optical attenuation system. That is, the dynamic range for electronic attenuation is always exhausted before the level of optical attenuation is either increased or decreased. This gain control hysteresis technique maximizes system reliability by reducing the duty cycle for the less-durable, mechanically implemented optical attenuation system.

The preferred gain control hysteresis technique, involving as it does the choice of a low duty cycle for the mechanically implemented optical attenuation system over marginal improvements in the signal-to-noise ratio for decreasing levels of attenuation, represents an engineering design tradeoff. A different engineering design approach could be employed without departing from the principals of the present invention. In particular, the microprocessor 97 could be programmed to provide translation and electronic attenuation signals designed to optimize the signal-to-noise ratio.

In addition to providing the electronic attenuation and translation signals that control, respectively, electronic and optical attenuation for gain-control purposes, microprocessor 97 also generates the translation signal that controls focal length correction for the LED in transmitter optics 20. Microprocessor 97 includes an output coupled via line 26A to the stepper motor 26 for LED 25. An analog signal representative of ambient temperature is applied to an A/D converter 98 for conversion into a temperature signal code which is applied to microprocessor 97. Microprocessor 97 references the temperature signal code to a stored-in-memory (such as ROM or PROM) look-up table containing corresponding, experimentally-determined focal lengths for a predetermined ambient temperature range, and provides an appropriate translation signal output on line 26A to cause stepper motor 26 to translate LED 25 so as to maintain its position at the true focal point of lens 27. (Photoreceptor translation is determined by optical attenuation considerations rather than focal length correction considerations; however, microprocessor 97 uses stored information regarding the actual focal length of lens 33 to determine the direction of photoreceptor translation for optical attenuation.)

The decoding of the data signal output from gain-controlled amplifier 90, gain-adjusted for optimum signal level, is accomplished as follows. After low pass filtering by filter 91, the gain-adjusted data signal is applied to a zero-crossing detector 102 which provides a waveform with precisely the same frequency and phase as the data signal; in effect, the zero-crossing detector reproduces the encoded data signal output from the encoder in the transmitter channel 50. The output from zero-crossing detector 102 is applied to a decoder 104 and a phase lock loop network 106.

Decoder 104 and phase lock loop network 106 function to recover the data transmitted over the optical data link by recovering the system clock embodied in the encoded data signal and decoding the data signal using the recovered system clock. Phase lock loop network 106 operates in the conventional manner of such networks to initially detect the precise frequency of the system clock, lock onto that frequency and provide a corresponding clock signal that is substantially unaffected by noise. The recovered system clock output from the phase lock loop network 106 is applied to decoder 104, thereby synchronizing the decoding of the data signal with the system clock embodied in the encoded data signal. The decoder 104 decodes the data signal according to the self-clocking format used for encoding, thereby synchronizing data reception and decoding with data encoding and transmission.

The decoded data signal output from decoder 104 is applied to interface line transmitter 45T. As discussed previously, the interface line transmitter 45T performs voltage level conversion in coupling the decoded data signal to the utilization devices associated with transceiver 10.

For some data transmission applications, terminating transmission is preferable to transmitting error-prone data as would be the case if the signal-to-noise ratio deteriorated to the extent that phase lock loop network 106 was unable to recover the system clock. For a preferred embodiment, phase detector network 108 is used to monitor the clock recovery function performed by phase lock loop network 106, determining whether the phase lock loop network is adequately regenerating the system clock so as to permit the accurate decoding of the data signal. In effect, the phase detector 108 determines whether the received data signal is of a sufficiently good signal-to-noise ratio that the phase lock loop network 106 can accurately regenerate the system clock to permit the accurate decoding of the data signal by decoder 106.

Phase detector 108 is coupled to receive the data signal output from zero crossing detector 102 and the clock output from phase lock loop network 106; in response, the peak detector provides a phase output representative of the phase difference between the data signal and the clock output from the phase lock loop. The phase output from phase detector 108 is applied to a comparator 109 which provides a clock-loss indication whenever the phase output indicates more than a predetermined amount of phase discrepancy, i.e., indicating phase lock loss. The clock loss indication from comparator 109 is provided to microprocessor 97 which can shut down for a predetermined time period the optical data link by providing a disenabling pulse via line 45A to the interface line receiver/transmitter 45R/45T to prevent data from being transmitted to the utilization device(s) until the phase lock loop can lock onto the system clock, thereby avoiding the transmission of error-prone data.

As discussed above with reference to FIG. 1, transceiver 10 incorporates sun-blind protection, i.e., protection against overloading photoreceptor 35 or LED 25 due to the substantial alignment of the sun with the optical axes of the optical transceiver. The DC level signal (from preamplifier 38 in receiver optics 30), corresponding to the intensity of the sunlight impinging upon the photoreceptor 35, is applied to a DC level detector 99 which is coupled to microprocessor 97. The DC level detector 99 provides a sun-blind indication to microprocessor 97 when the magnitude of the DC level signal exceeds a predetermined reference level. In response to a sun-blind indication, microprocessor 97 generates a shutter-close command that causes shutters 27 and 33 to close. After a programmed time delay, microprocessor 97 generates a shutter-open command, reopening shutters 27 and 33. If, in response to the resulting DC level signal, DC level detector 99 indicates a sun-blind condition persists, a new shutter-close command is generated by microprocessor 97. This procedure is repeated until the intensity of the impinging sunlight is sufficiently reduced that a sun-blind condition no longer exists.

A preferred gain-controlled amplifier 90 includes an amplifier and an electronic switched attenuator network. A preferred phase lock loop network includes a voltage controlled oscillator or low-pass filter and a phase detector. Those skilled in the art will recognize that DC level detector 99 and comparator 109 can be eliminated; that is, the comparison function provided by these networks can be performed internally by microprocessor 97.

AUXILIARY CHANNEL

The optical data link of the present invention provides an auxiliary channel 120 for intra-link communication. For example, auxiliary channel 120 can be used to transmit voice communications between the optical transceivers of the optical data link for testing, maintenance and other purposes, permitting system diagnostics to be performed from one end. Another function for the auxiliary channel would be the provision of a low-speed (for example, 1 kilobit per second) data communication channel linking the microprocessors of the optical transceivers over which status information could be exchanged. These two uses for the auxiliary channel 20 are illustrative; other intra-link channels could be provided subject to bandwidth limitations.

Referring to FIG. 3, the auxiliary channel 120 will be described with reference to the intra-link communication of audio signals and of data signals from the microprocessors (97) of the optical transceivers. Microprocessor data signals are applied through a UART (universal asynchronous receiver transmitter) 121 to a modem 122 for conversion into tones. UART 121 provides synchronous communication and parallel/serial conversion. The analog output from the modem 122 is applied to an FM modulator 124. Simultaneously, audio signals are applied to an audio amplifier 126 with the output of the audio amplifier being applied to FM modulator 124.

FM modulator 124 modulates the audio signals and the analog microprocessor data signals using a carrier of a higher frequency than the digital data signals communicated over the optical data link. The output from FM modulator 124 is applied to the driver amplifier in transmitter optics 20 which modulates the optical energy output from the LED in the transmitter optics. The carrier for the auxiliary FM signal is chosen to be sufficiently higher in frequency than the amplitude modulated data signals (from the encoder network in transmitter channel 50) so that the auxiliary FM signals are superimposed on the AM data signals without any interference during transmission over the optical data link (the typical amplitude of the auxiliary FM signal is ten (10%) percent of the data signal amplitude).

At the receive-end optical transceiver, the AM data signal and the superimposed auxiliary FM signal are applied to channel separator 130. Channel separator 130 comprises a low pass filter 132 and a band pass filter 134. The AM data signal and the superimposed auxiliary FM signal are applied to both filters such that low pass filter 132 couples the AM data signal to receiver channel 80 while the band pass filter 134 couples the auxiliary FM signal to a FM demodulator 128.

The demodulated output from FM demodulator 128 is applied to an audio filter 127 and a band pass filter 129. Band pass filter 129 couples the analog microprocessor data signal to modem 122 for digital conversion. The microprocessor data is coupled through UART 121, wich provides serial-to-parallel conversion to the microprocessor. The audio filter 27 couples the audio portion of the auxiliary FM signal to audio amplifier 126 for conversion into audio output.

Other embodiments and modifications of the present invention will readily be apparent to those of ordinary skill in the art having the benefit of the teachings presented in the foregoing description of the preferred embodiment and the drawings. It is therefore to be understood that this invention is not limited to the recitations in the preferred embodiment but that such modifications and embodiments are intended to be included in the scope of the appended Claims.

The embodiments of the invention in which an exclusive property or privilege is claimed are defined as follows:

1. An optical data link for communicating information between two data facilities in which at least one includes a source or sources of information and the second a device or devices for utilizing the information, the optical data link comprising:
   (a) an optical transmitter network including
      first interface means coupled to receive electrical data signals from a data source(s),
      a radiant energy source responsive to the data signals from said interface means to generate a modulated radiant energy output, and
      first optical means for collimating the modulated radiant energy, said radiant energy source being positioned at the nominal focal point of such optical means;
   (b) an optical receiver network aligned in spaced facing relation to said optical transmitter network for receiving the modulated radiant energy including
      second optical means for focusing the incident modulated radiant energy,
      a photoreceptor positioned at the nominal focal point of said second optical means for converting the impinging modulated radiant energy into corresponding electrical data signals, an amplifier network for amplifying the data signals from said photoreceptor, and second interface means for coupling the amplified data signals to the utilization device(s); and (c) signal level control means for controlling the signal level of the data signals coupled to the data utilization device(s) including focal length correction means responsive to a temperature indication representative of ambient temperature to maintain said radiant energy source at the actual focal point of said first optical means, and to determine the actual focal point of said second optical means such that said photoreceptor is positionable at the actual focal point, thereby counteracting temperatue-induced focal length distortions, electronic attenuation means in said amplifier network responsive to an electronic attenuation signal to selectively attenuate the output signal level from said amplifier network within a predetermined dynamic range of attenuation so as to achieve an optimum signal level for the data signals coupled to the data utilization device(s), optical attenuation means responsive to an optical attenuation signal to selectively attenuate the modulated radiant energy incident on said photoreceptor by a predetermined amount, signal level comparing means for comparing the output signal level from said amplifier network with a reference level corresponding to the optimum signal level and providing an appropriate electronic attenuation signal, said signal level comparing means providing an appropriate optical attenuation signal if the dynamic range for said electronic attenuation means is exhausted without achieving the optimum signal level.

2. The optical data link defined in claim 1 wherein said focal length correction means comprises:

(a) first translation means responsive to a first translation signal for translating said radiant energy source along the optical axis of said first optical element to a preselected position relative to its nominal focal point;

(b) second translation means responsive to a second translation signal for translating said photoreceptor along the optical axis of said second optical element to a preselected position relative to its nominal focal point, and (c) translation control means responsive to the temperature indication to provide appropriate first and second translation signals such that, respectively, said radiant energy source and said photoreceptor are positionable at the respective actual focal point.

3. The optical data link defined in claim 2 wherein said first and second translation means both comprise stepper motors for incrementally translating, respectively, said radiant energy source and said photoreceptor.

4. The optical data link defined in claim 1 wherein said optical attenuation means comprises translation means responsive to an optical attenuation signal for translating said photoreceptor along the optical axis of said second optical means to a preselected position relative to its actual focal point such that optical attenuation is incrementally increased by translating said photoreceptor away from the focal point by a preselected amount while optical attenuation is incrementally decreased by translating said photoreceptor toward the focal point by a predetermined amount.

5. The optical data link defined in claim 1 wherein:

(a) said optical transmitter network further comprises:

first translation means responsive to a first translation signal to selectively translate said radiant energy source along the optical axis of said first optical means to a preselected position relative to a nominal focal point;

(b) said optical receiver network further comprises:

second translation means responsive to a second translation signal to selectively translate said photoreceptor along the optical axis of said second optical means to a preselected position relative to the actual focal point, and electronic attenuation means responsive to an electronic attenuation signal to selectively attenuate the output signal level from said amplifier network within a predetermined dynamic range of attenuation; and (c) said signal level control means comprises:

processing means responsive to a temperature digital code representative of ambient temperature and a signal level digital code representative of the output signal level from said amplifier network to provide an appropriate first translation signal such that said radiant energy source is positioned at the actual focal point of said first optical means, thereby counteracting temperature-induced focal length distortion, an appropriate electronic attenuation signal so as to provide an optimum signal level for the data signals coupled to the data utilization device(s), and, if the dynamic range for said electronic attenuation means is exhausted without achieving the optimum signal level, an appropriate second translation signal such that optical attenuation is incrementally increased by translating said photoreceptor away from the actual focal point while optical attenuation is incrementally decreased by translating said photoreceptor toward the actual focal point.

6. The optical data link defined in claim 5 wherein said processing means comprises a microprocessor network.

* * * * *